(12) United States Patent
Kim et al.

(10) Patent No.: US 9,991,514 B2
(45) Date of Patent: Jun. 5, 2018

(54) METHOD OF MANUFACTURING LITHIUM NICKEL COMPLEX OXIDE, LITHIUM NICKEL COMPLEX OXIDE MANUFACTURED THEREBY, AND CATHODE ACTIVE MATERIAL INCLUDING THE SAME

(71) Applicant: LG Chem, Ltd., Seoul (KR)

(72) Inventors: Ji Hye Kim, Daejeon (KR); Sung Bin Park, Daejeon (KR); Wang Mo Jung, Daejeon (KR); Sang Seung Oh, Daejeon (KR); Byung Chun Park, Daejeon (KR)

(73) Assignee: LG Chem, Ltd. (KR)

( * ) Notice: Subject to any disclaimer, the term of this patent is extended or adjusted under 35 U.S.C. 154(b) by 881 days.

(21) Appl. No.: 14/457,478

(22) Filed: Aug. 12, 2014

(65) Prior Publication Data

US 2015/0064563 A1    Mar. 5, 2015

(30) Foreign Application Priority Data

Aug. 29, 2013  (KR) .................. 10-2013-0103163
Jul. 22, 2014  (KR) .................. 10-2014-0092643

(51) Int. Cl.
*H01M 4/525* (2010.01)
*H01M 4/505* (2010.01)
*H01M 10/052* (2010.01)
*C01G 53/00* (2006.01)

(52) U.S. Cl.
CPC ............ *H01M 4/525* (2013.01); *C01G 53/50* (2013.01); *H01M 4/505* (2013.01); *C01P 2002/54* (2013.01); *C01P 2002/72* (2013.01); *C01P 2002/77* (2013.01); *C01P 2004/62* (2013.01); *C01P 2004/64* (2013.01); *H01M 10/052* (2013.01)

(58) Field of Classification Search
None
See application file for complete search history.

(56) References Cited

U.S. PATENT DOCUMENTS

| 5,296,318 A * | 3/1994 | Gozdz .................. C08J 9/28 429/316 |
| 7,205,072 B2 * | 4/2007 | Kang .................. C01G 53/006 429/231.1 |
| 7,923,149 B2 | 4/2011 | Hwang et al. |
| 2003/0104273 A1 | 6/2003 | Lee et al. |
| 2005/0069778 A1 * | 3/2005 | Bonnet .................. H01M 4/621 429/246 |
| 2010/0086854 A1 | 4/2010 | Kumar et al. |
| 2011/0052981 A1 * | 3/2011 | Lopez .................. C01G 45/1257 429/206 |
| 2012/0261610 A1 | 10/2012 | Paulsen et al. |
| 2012/0270104 A1 * | 10/2012 | Paulsen .................. H01M 4/131 429/212 |
| 2014/0231720 A1 * | 8/2014 | Oh .................. H01M 4/505 252/506 |

FOREIGN PATENT DOCUMENTS

| CN | 102171868 A | 8/2011 |
| CN | 102612776 A | 7/2012 |
| JP | 2008-047306 A | 2/2008 |
| KR | 100406690 B1 | 11/2003 |
| KR | 10-0786850 B1 | 12/2007 |
| KR | 2012-0093983 A | 8/2012 |

* cited by examiner

*Primary Examiner* — Rena Dye Cronin
(74) *Attorney, Agent, or Firm* — Lerner, David, Littenberg, Krumholz & Mentlik, LLP

(57) ABSTRACT

Provided are a method of manufacturing a lithium nickel complex oxide including mixing a nickel-containing mixed transition metal precursor, a lithium compound, and a polyvinylidene fluoride-hexafluoropropylene (PVdF-HFP) copolymer, and heat treating the mixture, a lithium nickel complex oxide manufactured thereby, and a cathode active material including the lithium nickel complex oxide. The method of manufacturing a lithium nickel complex oxide according to an embodiment of the present invention may adjust a ratio of divalent nickel ($Ni^{II}$) to trivalent nickel ($Ni^{III}$) by using a polyvinylidene fluoride-hexafluoropropylene (PVdF-HFP) copolymer, and thus, the method may improve capacity of a secondary battery.

7 Claims, 4 Drawing Sheets

METHOD OF MANUFACTURING LITHIUM NICKEL COMPLEX OXIDE, LITHIUM NICKEL COMPLEX OXIDE MANUFACTURED THEREBY, AND CATHODE ACTIVE MATERIAL INCLUDING THE SAME

CROSS-REFERENCE TO RELATED APPLICATIONS

The present application claims priority from Korean Patent Application Nos. 10-2014-0092643 filed Jul. 22, 2014, and 10-2013-0103163 filed Aug. 29, 2013, the disclosures of which are hereby incorporated herein by reference.

BACKGROUND OF THE INVENTION

Field of the Invention

The present invention relates to a method of manufacturing a lithium nickel complex oxide, a lithium nickel complex oxide manufactured thereby, and a cathode active material including the lithium nickel complex oxide.

Description of the Related Art

Demand for secondary batteries as an energy source has been significantly increased as technology development and demand with respect to mobile devices have increased. Among these secondary batteries, lithium secondary batteries having high energy density, high operating potential, long cycle life, and low self-discharging rate have been commercialized and widely used.

Also, in line with growing concerns about environmental issues, a significant amount of research into electric vehicles and hybrid electric vehicles, which may replace vehicles using fossil fuels, such as gasoline vehicle and diesel vehicle, one of major causes of air pollution, has been conducted.

Nickel-metal hydride secondary batteries have been mainly used as power sources of the electric vehicles and hybrid electric vehicles. However, research into the use of lithium secondary batteries having high energy density and discharge voltage has been actively conducted and some of the research are in a commercialization stage.

Lithium-containing cobalt oxides are mainly used as cathode active materials of lithium secondary batteries, and in addition, the uses of lithium-containing manganese oxides having a layered crystal structure or a spinel crystal structure and lithium-containing nickel oxides are also in consideration.

The lithium-containing cobalt oxides among the above cathode active materials have been most widely used due to their excellent life characteristics and charge and discharge efficiency. However, since the lithium-containing cobalt oxides have low high-temperature stability and are relatively expensive materials due to the resource limit of cobalt used as a raw material, the lithium-containing cobalt oxides have disadvantages in that price competiveness is limited. The lithium-containing manganese oxides having a layered crystal structure or a spinel crystal structure have advantages in that thermal stability is excellent, they are inexpensive, and synthesis thereof is easy. However, the lithium-containing manganese oxides have limitations in that capacity is low, high-temperature characteristics are poor, and conductivity is low.

Also, the lithium nickel oxides are relatively inexpensive and exhibit battery characteristics such as high discharge capacity, but the lithium nickel oxides have limitations in that a rapid phase transition of a crystal structure may occur due to the volume changes accompanying charge and discharge cycles and stability may be rapidly reduced when exposed to air and humidity.

In order to address the above limitations, a significant amount of attempts and research into using lithium oxides, in which nickel-manganese and nickel-cobalt-manganese are respectively mixed at a ratio of 1:1 and 1:1:1, as a cathode active material has been conducted. A cathode active material prepared by mixing nickel, cobalt, or manganese has improved physical properties in comparison to cathode active materials prepared by separately using transition metals. However, simplification of a manufacturing process and improvement of rate capability still remain as issues that need to be addressed.

In particular, a lithium secondary battery including a typical cathode active material presents difficulties in its application to electric vehicles because it exhibits unstable life characteristics under high-voltage charge and discharge conditions for obtaining high capacity, and accordingly, the improvement thereof is required.

PRIOR ART DOCUMENTS

Japanese Patent Application Laid-Open Publication No. 2008-047306

SUMMARY OF THE INVENTION

An aspect of the present invention provides a method of manufacturing a lithium nickel complex oxide which may improve capacity characteristics of a secondary battery by adjusting a ratio of divalent nickel ($Ni^{II}$) to trivalent nickel ($Ni^{III}$) in a lithium nickel oxide.

Another aspect of the present invention provides a lithium nickel complex oxide manufactured by the above method.

Another aspect of the present invention provides a cathode active material including the lithium nickel complex oxide.

Another aspect of the present invention provides a cathode and a lithium secondary battery including the cathode active material.

According to an aspect of the present invention, there is provided a method of manufacturing a lithium nickel complex oxide including: preparing a mixture of a lithium nickel oxide and a polyvinylidene fluoride-hexafluoropropylene (PVdF-HFP) copolymer; and heat treating the mixture.

According to another aspect of the present invention, there is provided a lithium nickel complex oxide of Chemical Formula 1:

$$Li_w Ni^{II}_{x1} Ni^{III}_{x2} Mn_y Co_z F_d O_{2-d} \qquad \text{<Chemical Formula 1>}$$

where x1+x2+y+z=1, 0.4≤x1+x2≤0.9, 0<y≤0.6 and 0<z≤0.6, 0.9≤w≤1.3, and 0<d≤0.3.

According to another aspect of the present invention, there is provided a cathode active material including the lithium nickel complex oxide.

According to another aspect of the present invention, there is provided a cathode and a lithium secondary battery including the cathode active material.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DETAILED DESCRIPTION OF THE PREFERRED EMBODIMENT

Figure 1:
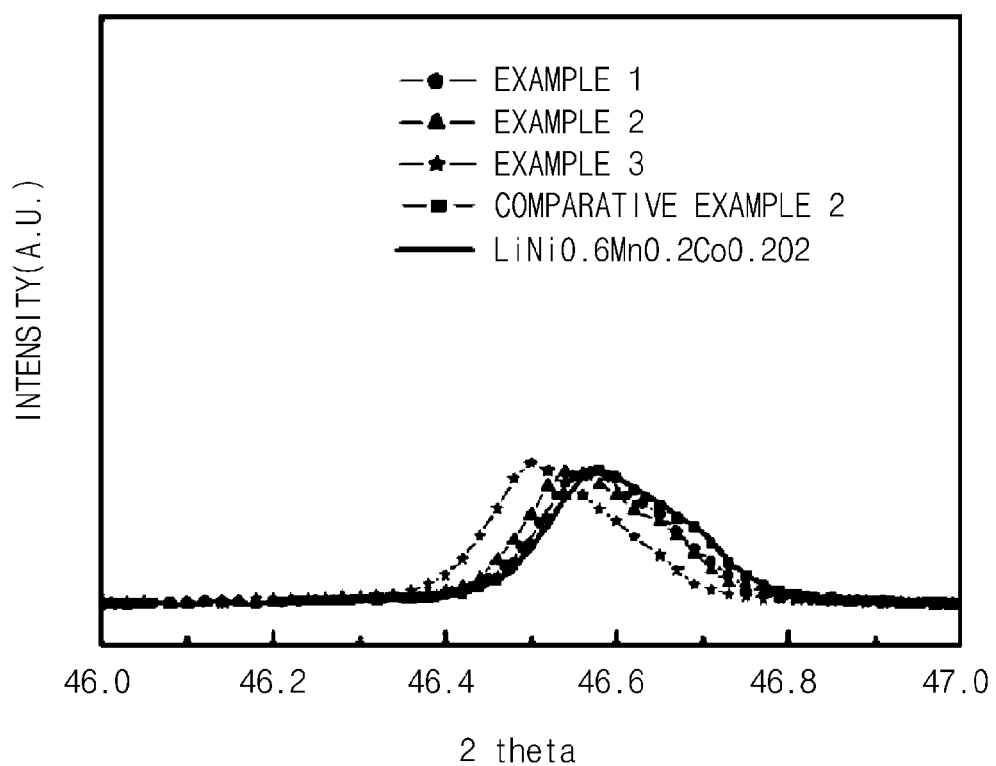
FIG. 1 is a graph illustrating the results of X-ray diffraction analysis of Examples 1 to 3, Comparative Example 2, and $LiNi_{0.6}Mn_{0.2}Co_{0.2}O_2$ (bare)

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method of manufacturing a lithium nickel complex oxide including preparing a mixture of a lithium nickel oxide and a polyvinylidene fluoride-hexafluoropropylene (PVdF-HFP) copolymer, and heat treating the mixture.

In general, when an amount of nickel atoms (nickel ions) constituting a lithium nickel oxide is excessive, for example, 40% or more, in particular, 60% or more, a rapid phase transition of a crystal structure may occur due to the volume changes accompanying charge and discharge cycles, and stability may be rapidly reduced when exposed to air and moisture.

In the present invention, it was found that electrochemical performance of a secondary battery, in particular, capacity characteristics of a secondary battery, may be improved by adjusting a ratio of divalent nickel (hereinafter, referred to as "$Ni^{II}$") to trivalent nickel (hereinafter, referred to as "$Ni^{III}$") in a lithium nickel oxide with excess nickel atoms.

That is, according to a method of manufacturing a lithium nickel complex oxide according to an embodiment of the present invention, a portion of oxygen atoms of a lithium nickel oxide may be substituted with fluorine (F) atoms by using a polyvinylidene fluoride-hexafluoropropylene (PVdF-HFP) copolymer and heat treating at a specific temperature, and thus, a ratio of $Ni^{II}$ in the lithium nickel oxide may be increased.

In the manufacturing method according to the embodiment of the present invention, a melt flow index of the polyvinylidene fluoride-hexafluoropropylene copolymer may be in a range of 3 g/10 min to 20 g/10 min at a temperature of 140° C. to 230° C.

Herein, the expression "melt flow index" denotes a weight of the polyvinylidene fluoride-hexafluoropropylene copolymer being melted and flowing in ten minutes at a predetermined temperature. Also, the unit [g/min] of the melt flow index may be affected by various physical properties. However, since the unit is changed according to a temperature, the melt flow index must be relatively compared based on a reference temperature and a reference time (10 minutes).

Specifically, in a case where a polyvinylidene fluoride-hexafluoropropylene copolymer having the above melt flow index is used to perform a surface treatment on a lithium nickel complex oxide, the lithium nickel complex oxide may be doped with F atoms while some F atoms of the polyvinylidene fluoride-hexafluoropropylene copolymer are melted into the lithium nickel complex oxide after a specific heat treatment.

Since a portion of oxygen atoms ($O^{2-}$ sites) may be substituted with the doped F, the ratio of $Ni^{II}$ among $Ni^{II}$ and $Ni^{III}$ coexisted in the oxide may be particularly increased. In this case, the ratio of $Ni^{II}$ may be changed according to the melt flow index of the polyvinylidene fluoride-hexafluoropropylene copolymer.

In the case that the melt flow index is less than 3 g/10 min, since flowability of the polyvinylidene fluoride-hexafluoropropylene copolymer is poor, the polyvinylidene fluoride-hexafluoropropylene copolymer may not be uniformly distributed on the surface of the lithium nickel complex oxide. In contrast, in the case in which the melt flow index is greater than 20 g/10 min, that is, an amount of hexafluoropropylene (HFP) is increased, physical properties are changed due to this, and thus, the improvement of capacity characteristics of a secondary battery as desired in the present invention may not be obtained.

Also, the amount of the hexafluoropropylene (HFP) in the polyvinylidene fluoride-hexafluoropropylene copolymer is in a range of 1% to 30%, preferably in a range of 5% to 20%, and more preferably in a range of 10% to 18% based on a total amount of the polyvinylidene fluoride-hexafluoropropylene copolymer. In the case that the amount of the HFP is less than 1%, since the flowability may decrease, the polyvinylidene fluoride-hexafluoropropylene copolymer may not be uniformly distributed on the surface of the cathode active material. In the case in which the amount of the HFP is greater than 30%, it may not be desirable because physical properties may be changed.

According to an embodiment of the present invention, the polyvinylidene fluoride-hexafluoropropylene copolymer may be used in an amount of 0.2 wt % to 0.5 wt % based on 100 wt % of the lithium nickel oxide.

According to an embodiment of the present invention, a lithium nickel oxide having 40% of Ni, in particular 60% or more of Ni, may be used as the lithium nickel oxide. For example, $Li_wNi_xMn_yCo_zO_2$ (where x+y+z=1, 0.4≤x≤0.9, 0<y≤0.6, 0<z≤0.6, and 0.9≤w≤1.3) may be used as the lithium nickel oxide.

Also, a manufacturing method according to an embodiment of the present invention may include preparing the mixture of the lithium nickel oxide and a polyvinylidene fluoride-hexafluoropropylene copolymer, and heat treating the mixture after a nickel-containing mixed transition metal precursor and a lithium compound are mixed and sintered to obtain a lithium nickel oxide.

As the nickel-containing mixed transition metal precursor, a nickel-containing mixed transition metal precursor typically used for the preparation of a cathode active material in the art may be used, but the present invention is not limited thereto. For example, a nickel/manganese/cobalt precursor compound having a composition of MOOH or $M(OH)_2$ (where $M=Ni_xMn_yCo_z$, 0.4≤x≤0.9, 0<y≤0.6, 0<z≤0.6, and x+y+z+1) may be used as the nickel-containing mixed transition metal precursor.

Also, the lithium compound (lithium source), for example, may include $Li_2CO_3$, LiOH, or a mixture thereof, but the present invention is not limited thereto.

Furthermore, the heat treatment, for example, may be performed in a temperature range of 250° C. to 500° C. for 5 hours to 10 hours. In the case that the heat treatment temperature is less than 250° C., since the surface treatment of the lithium nickel oxide with the polyvinylidene fluoride-hexafluoropropylene copolymer may not be properly performed, a portion of oxygen atoms may not be substituted with F atoms. In the case in which the heat treatment temperature is greater than 500° C., the oxide may be deformed.

Therefore, in the case that the surface treatment is performed at the above specific heat treatment temperature, the lithium nickel oxide may be doped with some F atoms of the polyvinylidene fluoride-hexafluoropropylene copolymer while the polyvinylidene fluoride-hexafluoropropylene copolymer is melted. Since a portion of oxygen atoms ($O^{2-}$ sites) may be substituted with the doped F, the ratio of $Ni^{II}$ among $Ni^{II}$ and $Ni^{III}$ coexisted in the oxide may be particularly increased.

According to an embodiment of the present invention, a doping amount of the doped (substituted) F atoms may be in a range of 1,000 ppm to 5,000 ppm.

That is, a lithium nickel complex oxide manufactured by the method of manufacturing a lithium nickel complex oxide according to the embodiment of the present invention, for example, may be expressed by Chemical Formula 1 below:

$$Li_w Ni^{II}_{x1} Ni^{III}_{x2} Mn_y Co_z F_d O_{2-d}$$ <Chemical Formula 1> in Chemical Formula 1,
x1+x2+y+z=1,
0.4≤x1+x2≤0.9,
0<y≤0.6 and 0<z≤0.6,
0.9≤w≤1.3, and
0<d≤0.3.

The lithium nickel complex oxide may have a structure in which $Ni^{II}$ and $Ni^{III}$ coexist and some $Ni^{II}$ among them are intercalated into reversible lithium layers. That is, Ni ions intercalated into the reversible lithium layers may be $Ni^{II}$. Since the $Ni^{II}$ has a size very similar to that of a lithium ion ($Li^+$), the $Ni^{II}$ may suppress structural collapse due to the repulsive force of a transition metal oxide (MO) layer when the lithium ions are deintercalated during charge while being intercalated into the reversible lithium layers and not transforming a crystal structure. As a result, the desired improvement of charge stability and cycle stability may be obtained.

However, when a mole fraction of the $Ni^{II}$ intercalated into the reversible lithium layers is excessively high, mixing of cations may increase to locally form a rock salt structure that does not electrochemically react. Thus, charge and discharge may not only be obstructed, but discharge capacity may also be reduced.

According to an embodiment of the present invention, it may be desirable for a molar ratio of $Ni^{II}$ to $Ni^{III}$ in Chemical Formula 1, that is, x1/x2 to satisfy 0.4≤x1/x2≤0.48, in terms of capacity characteristics of a secondary battery.

For example, in $Li_w Ni^{II}_{x1} Ni^{III}_{x2} Mn_y Co_z F_d O_{2-d}$, it may be desirable for x1/x2 to satisfy 0.48≤x1/x2≤0.5 before the treatment with the polyvinylidene fluoride-hexafluoropropylene copolymer and to satisfy 0.4≤x1/x2≤0.48 after the treatment with the polyvinylidene fluoride-hexafluoropropylene copolymer, in terms of the capacity characteristics of the secondary battery.

As a relatively Ni-excessive composition in comparison to manganese and cobalt, a total mole fraction (x1+x2) of the Ni may be in a range of 0.4 to 0.9. In the case that the amount of nickel is less than 0.4, high capacity may not be expected. In contrast, in the case in which the amount of nickel is greater than 0.9, safety may be significantly reduced.

The amount (z) of cobalt may be greater than 0 and equal to or less than 0.6. In the case that the amount of cobalt is excessively high, i.e., z>0.6, overall raw material costs may increase due to the high amount of cobalt and reversible capacity may be somewhat reduced.

In the case that the amount of lithium is excessively high, that is, w>1.3, safety may be particularly reduced during cycles at a high voltage (U=4.35 V) at T=60° C. In contrast, in the case in which the amount of lithium is excessively low, that is, w<0.9, low rate characteristics may be obtained and reversible capacity may be reduced.

Also, the present invention provides a cathode active material including the lithium nickel complex oxide.

Furthermore, the present invention provides a cathode including the cathode active material.

The cathode may be prepared according to a typical method known in the art. For example, a binder, a conductive agent, and a dispersant, if necessary, as well as a solvent are mixed with a cathode active material and stirred to prepare a slurry, and a metal current collector is then coated with the slurry and pressed. Thereafter, the cathode may be prepared by drying the metal current collector.

Any metal may be used as the metal current collector so long as it is a metal having high conductivity as well as no reactivity in a voltage range of the battery to which the slurry of the electrode active material may be easily adhered. Non-limiting examples of the cathode current collector may include aluminum, nickel, or a foil prepared by a combination thereof.

An organic solvent, such as N-methylpyrrolidone (NMP), dimethylformamide (DMF), acetone, and dimethylacetamide, or water, may be used as the solvent for forming the cathode. These solvents may be used alone or in a mixture of two or more thereof. An amount of the solvent used may be sufficient if the solvent may dissolve and disperse the electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly (acrylic acid), polymers in which hydrogens thereof are substituted with lithium (Li), sodium (Na), or calcium (Ca), or various copolymers, may be used as the binder.

Any conductive agent may be used without particular limitation so long as it has suitable conductivity without causing adverse chemical changes in the batteries. For example, the conductive agent may include a conductive material such as: graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives.

An aqueous-based dispersant or an organic dispersant, such as N-methyl-2-pyrrolidone, may be used as the dispersant.

Also, the present invention provides a lithium secondary battery including the cathode, an anode, and a separator disposed between the cathode and the anode.

A carbon material, lithium metal, silicon, or tin, which may intercalate and deintercalate lithium ions, may be typically used as an anode active material that is used in the anode according to an embodiment of the present invention. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Furthermore, the anode collector is generally fabricated to have a thickness of 3 µm to 500 µm. The anode collector is not particularly limited so long as it has conductivity without causing adverse chemical changes in the batteries. The anode collector may be formed of, for example, copper, stainless steel, aluminum, nickel, titanium, fired carbon, copper or stainless steel that is surface-treated with one of carbon, nickel, titanium, silver, or the like, an aluminum-cadmium alloy, or the like. Also, like the cathode collector, the anode collector may have a fine roughness surface to improve bonding strength of an anode active material. The anode collector may have various shapes such as a film, a sheet, a foil, a net, a porous body, a foam body, a non-woven fabric body, and the like.

Similar to the cathode, a binder and a conductive agent, which are typically used in the art, may be used in the anode. An anode active material and the above additives are mixed and stirred to prepare an anode active material composition. Then, a current collector is coated therewith and pressed to prepare the anode.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the present invention is not limited thereto.

A lithium salt, which may be included as the electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte. However, the present invention is not limited thereto.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Hereinafter, the present invention will be described in more detail, according to examples and experimental examples. However, the present invention is not limited thereto.

<Preparation of Lithium Nickel Complex Oxide>

Example 1

MOOH (m=$Ni_{0.6}Mn_{0.2}Co_{0.2}$) was used as a nickel-containing mixed transition metal precursor. The nickel-containing mixed transition metal precursor and $Li_2CO_3$ were mixed at a stoichiometric ratio (Li:Mn=1.02:1) and the mixture was sintered at a temperature of about 900° C. to about 920° C. for 10 hours to obtain $LiNi_{0.6}Mn_{0.2}Co_{0.2}O_2$. 0.3 wt % of a polyvinylidene fluoride-hexafluoropropylene copolymer (amount of HFP: 12%) was added to $LiNi_{0.6}Mn_{0.2}Co_{0.2}O_2$ based on 100 wt % of the $LiNi_{0.6}Mn_{0.2}Co_{0.2}O_2$ and mixed. In this case, a melt flow index of the polyvinylidene fluoride-hexafluoropropylene copolymer was 3 g/10 min (measured under conditions of 230° C. and 2.16 kg, ISO 1133 standard).

The mixture was heat treated at about 250° C. for 5 hours in air to obtain a lithium nickel complex oxide.

Example 2

A lithium nickel complex oxide was obtained in the same manner as in Example 1 except that a heat treatment was performed at 300° C. for 5 hours.

Example 3

A lithium nickel complex oxide was obtained in the same manner as in Example 1 except that a heat treatment was performed at 350° C. for 5 hours.

Example 4

A lithium nickel complex oxide was obtained in the same manner as in Example 1 except that a polyvinylidene fluoride-hexafluoropropylene copolymer having a melt flow index of 8 g/10 min (measured under conditions of 230° C. and 2.16 kg, ISO 1133 standard) was used.

Example 5

A lithium nickel complex oxide was obtained in the same manner as in Example 1 except that a polyvinylidene fluoride-hexafluoropropylene copolymer having a melt flow index of 12 g/10 min (measured under conditions of 230° C. and 2.16 kg, ISO 1133 standard) was used.

Example 6

A lithium nickel complex oxide was obtained in the same manner as in Example 1 except that a polyvinylidene fluoride-hexafluoropropylene copolymer having a melt flow index of 15 g/10 min (measured under conditions of 230° C. and 2.16 kg, ISO 1133 standard) was used.

Example 7

A lithium nickel complex oxide was obtained in the same manner as in Example 1 except that a polyvinylidene fluoride-hexafluoropropylene copolymer having a melt flow index of 20 g/10 min (measured under conditions of 230° C. and 2.16 kg, ISO 1133 standard) was used.

Example 8

A lithium nickel complex oxide was obtained in the same manner as in Example 1 except that a polyvinylidene fluoride-hexafluoropropylene copolymer having a melt flow index of 6 g/10 min (measured under conditions of 230° C. and 2.16 kg, ISO 1133 standard) was used.

Comparative Example 1

A lithium nickel complex oxide was obtained in the same manner as in Example 1 except that a polyvinylidene fluoride-hexafluoropropylene copolymer was not added and a heat treatment was performed at 350° C. for 5 hours.

Comparative Example 2

A lithium nickel complex oxide was obtained in the same manner as in Example 1 except that a heat treatment was performed at 200° C. for 5 hours.

Comparative Example 3

A lithium nickel complex oxide was obtained in the same manner as in Comparative Example 1 except that a heat treatment was performed at 350° C. for 5 hours.

Comparative Example 4

A lithium nickel complex oxide was obtained in the same manner as in Example 1 except that a polyvinylidene fluoride-hexafluoropropylene copolymer having a melt flow index of 2 g/10 min (measured under conditions of 230° C. and 2.16 kg, ISO 1133 standard) was used.

Comparative Example 5

A lithium nickel complex oxide was obtained in the same manner as in Example 1 except that a polyvinylidene fluoride-hexafluoropropylene copolymer having a melt flow index of 22 g/10 min (measured under conditions of 230° C. and 2.16 kg, ISO 1133 standard) was used.

Comparative Example 6

A lithium nickel complex oxide was obtained in the same manner as in Example 1 except that a polyvinylidene fluoride-hexafluoropropylene copolymer having a melt flow index of 26 g/10 min (measured under conditions of 230° C. and 2.16 kg, ISO 1133 standard) was used.

<Preparation of Lithium Secondary Battery>

Examples 9 to 16

Cathode Preparation

Cathode mixture slurries were respectively prepared by adding 95 wt % of the lithium nickel complex oxides manufactured in Examples 1 to 8, 2.5 wt % of carbon black as a conductive agent, and 2.5 wt % of polyvinylidene fluoride (PVdF) as a binder to N-methyl-2-pyrrolidone (NMP) as a solvent. An about 20 μm thick aluminum (Al) thin film as a cathode collector was coated with the cathode mixture slurry and dried, and the Al thin film was then roll-pressed to prepare each cathode.

Anode Preparation

An anode active material slurry was prepared by mixing 96.3 wt % of carbon powder as an anode active material, 1.0 wt % of super-p as a conductive agent, and 1.5 wt % of styrene-butadiene rubber (SBR) and 1.2 wt % of carboxymethyl cellulose (CMC) as a binder, and adding the mixture to NMP as a solvent. A 10 μm thick copper (Cu) thin film as an anode collector was coated with the anode active material slurry and dried, and the Cu thin film was then roll-pressed to prepare an anode.

Non-Aqueous Electrolyte Solution Preparation

A non-aqueous electrolyte solution was prepared by adding 1 M $LiPF_6$ to a non-aqueous electrolyte solvent that was prepared by mixing ethylene carbonate and diethyl carbonate, as an electrolyte, at a volume ratio of 30:70.

Lithium Secondary Battery Preparation

A mixed separator of polyethylene and polypropylene was disposed between the cathode and anode thus prepared, and a polymer type battery was then prepared by a typical method. Then, the preparation of each lithium secondary battery was completed by injecting the prepared non-aqueous electrolyte solution.

Comparative Examples 7 to 12

Lithium secondary batteries were prepared in the same manner as in Examples 9 to 16 except that the lithium nickel complex oxides manufactured in Comparative Examples 1 to 6 were used as cathode active materials.

Comparative Example 13

A lithium secondary battery was prepared in the same manner as in Examples 9 to 16 except that $LiNi_{0.6}Mn_{0.2}Co_{0.2}O_2$ (bare) was used as a cathode active material.

Experimental Example 1

X-ray diffraction analyses were performed to identify whether the lithium nickel complex oxides manufactured in Examples 1 to 3 and Comparative Examples 1 and 2 were doped with F. The F doping may be determined by the presence of peak shift with respect to that of $LiNi_{0.6}Mn_{0.2}Co_{0.2}O_2$ (bare), and the results thereof are presented in Table 1 and FIG. 1 below.

TABLE 1

| Examples | Unit volume (Å³) | Delta (Å³) | Grain (nm) |
| --- | --- | --- | --- |
| Example 1 | 101.2612 | 0.0212 | 161.4 |
| Example 2 | 101.2741 | 0.0341 | 167.4 |
| Example 3 | 101.3154 | 0.0754 | 170.2 |
| Comparative Example 1 | 101.2468 | 0 | 157.2 |
| Comparative Example 2 | 101.2468 | 0.0068 | 157.6 |
| $LiNi_{0.6}Mn_{0.2}Co_{0.2}O_2$ | 101.2400 | 0 | 157.3 |

As illustrated in Table 1, it may be confirmed that unit volumes, deltas, and grains of the lithium nickel complex oxides of Examples 1 to 3 were significantly increased in comparison to those of $LiNi_{0.6}Mn_{0.2}Co_{0.2}O_2$ (bare) and Comparative Examples 1 and 2.

Specifically, when compared with reference to $LiNi_{0.6}Mn_{0.2}Co_{0.2}O_2$ (bare), the unit volume of $LiNi_{0.6}Mn_{0.2}Co_{0.2}O_2$ (bare) was 101.2400 Å³. In contrast, the unit volumes of Examples 1 to 3 were increased to 101.26 Å³ to 101.31 Å³, and the delta values of Examples 1 to 3 were increased to 0.02 Å³ to 0.075 Å³. Also, it may be confirmed that diameters of the grains of Examples 1 to 3 were increased to 161.4 nm to 170.2 nm in comparison to $LiNi_{0.6}Mn_{0.2}Co_{0.2}O_2$ (bare) having a diameter of the grains of 157.3 nm.

Also, in the case that the heat treatment was performed at a low temperature, i.e., 200° C., even if the polyvinylidene fluoride-hexafluoropropylene copolymer was used as in Comparative Example 2, the unit volume, delta, and grain thereof were similar to those of $LiNi_{0.6}Mn_{0.2}Co_{0.2}O_2$ (bare).

With respect to Comparative Example 1 in which the polyvinylidene fluoride-hexafluoropropylene copolymer was added and the heat treatment was performed at 350° C., the unit volume was 101.2468 Å³ which was lower than those of Examples 1 to 3, and the delta value was 0 Å³ which was significantly different from those of the present invention.

Furthermore, referring to a graph of FIG. 1, it may be confirmed that peaks of the lithium nickel complex oxides of Examples 1 to 3 were shifted to the right in comparison to that of $LiNi_{0.6}Mn_{0.2}Co_{0.2}O_2$ (bare) that was not doped with F.

In contrast, in the case that the heat treatment was performed at a low temperature, i.e., 200° C., even if the polyvinylidene fluoride-hexafluoropropylene copolymer was used as in Comparative Example 2, it may be confirmed in the graph of FIG. 1 that a peak was almost not shifted in comparison to that of $LiNi_{0.6}Mn_{0.2}Co_{0.2}O_2$ (bare).

Thus, as illustrated in Table 1 and FIG. 1, with respect to the lithium nickel complex oxides of Examples 1 to 3 of the present invention, when the polyvinylidene fluoride-hexafluoropropylene copolymer was used and heat treated at a specific temperature, the doping of the lithium nickel oxides with some F atoms may be identified by X-ray diffraction analysis.

Experimental Example 2

<Charge and Discharge Capacity Characteristics>

In order to investigate capacities of the lithium secondary batteries prepared in Examples 12 to 15 and Comparative Examples 10 and 11 according to charge and discharge cycles, the lithium secondary batteries prepared in Examples 12 to 15 and Comparative Examples 10 and 11 were charged at 0.1 C to a voltage of 4.25 V at 25° C. under a constant current/constant voltage (CC/CV) condition and then discharged at a CC of 0.1 C to a voltage of 3.0 V to measure capacities. The charge and discharge were repeated 1 to 30 cycles. Relative capacities as ratios of 30th cycle capacities to 1st cycle capacities are presented in Table 2 below.

TABLE 2

| Examples | Capacity (%) (cycle: Q30th/Q1st, 3.0 V) |
| --- | --- |
| Example 12 | 97.8 |
| Example 13 | 98.4 |
| Example 14 | 98.8 |
| Example 15 | 99.2 |
| Comparative Example 10 | 97.4 |
| Comparative Example 11 | 97.4 |

As illustrated in Table 2, with respect to the secondary batteries prepared in Examples 12 to 15 of the present invention, the capacities were in a range of 97% to 99.2%. In contrast, the capacities of Comparative Examples 10 and 11 were 97.4% which was significantly different from the capacities of the secondary batteries prepared in Examples 12 to 15 of the present invention.

Figure 2:
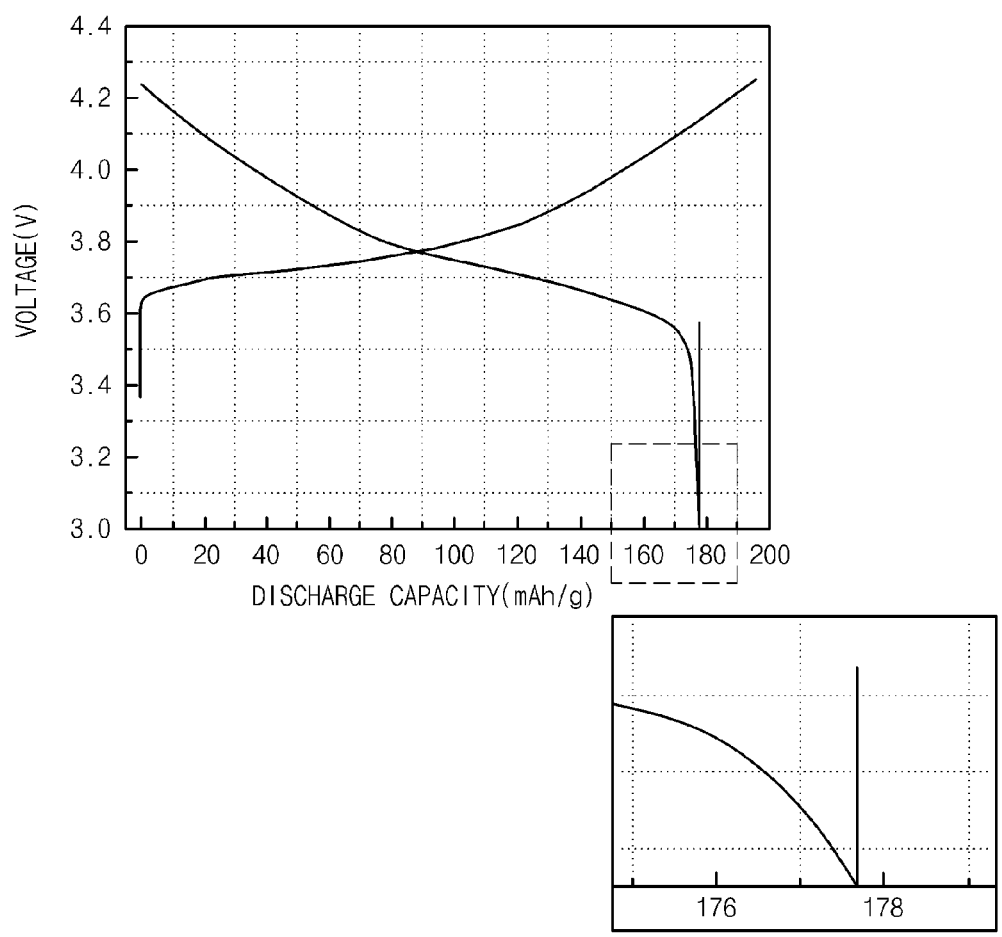
FIG. 2 is a graph illustrating capacity characteristics of a lithium secondary battery prepared according to Example 9 of the present invention.
Figure 3:
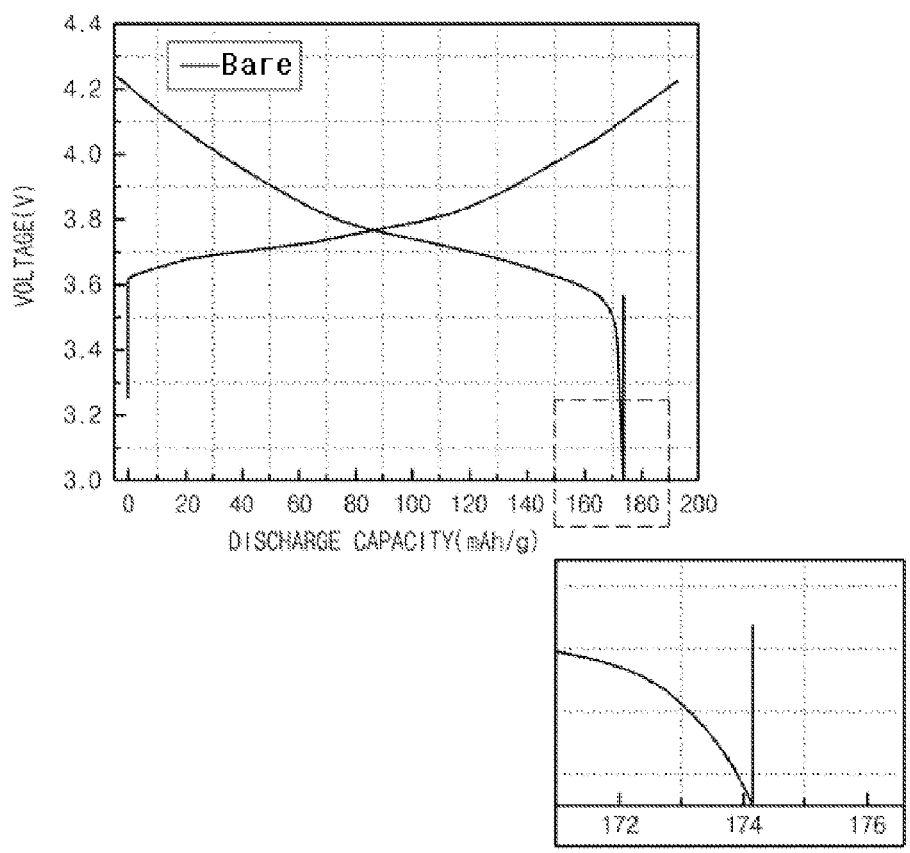
FIG. 3 is a graph illustrating capacity characteristics of a lithium secondary battery prepared according to Comparative Example 13.

Also, the measurement results of discharge capacities of the secondary batteries (Examples 9 and Comparative Example 13) using Example 1 and $LiNi_{0.6}Mn_{0.2}Co_{0.2}O_2$ (bare) as cathode active materials are presented in FIGS. 2 and 3, respectively.

Referring to FIGS. 2 and 3, with respect to Example 9 in which the lithium nickel complex oxide having a high ratio of divalent nickel ($Ni^{II}$) due to the F-doping was used, the discharge capacity of the secondary battery was 177.8 mAh/g. In contrast, with respect to Comparative Example 13 in which $LiNi_{0.6}Mn_{0.2}Co_{0.2}O_2$ (bare) without the F-doping was used, the discharge capacity was about 174 mAh/g. That is, it may be confirmed that the discharge capacity of the secondary battery of Example 9 was improved by about 3 mAh/g, in comparison to the discharge capacity of the secondary battery of Comparative Example 13.

Figure 4:
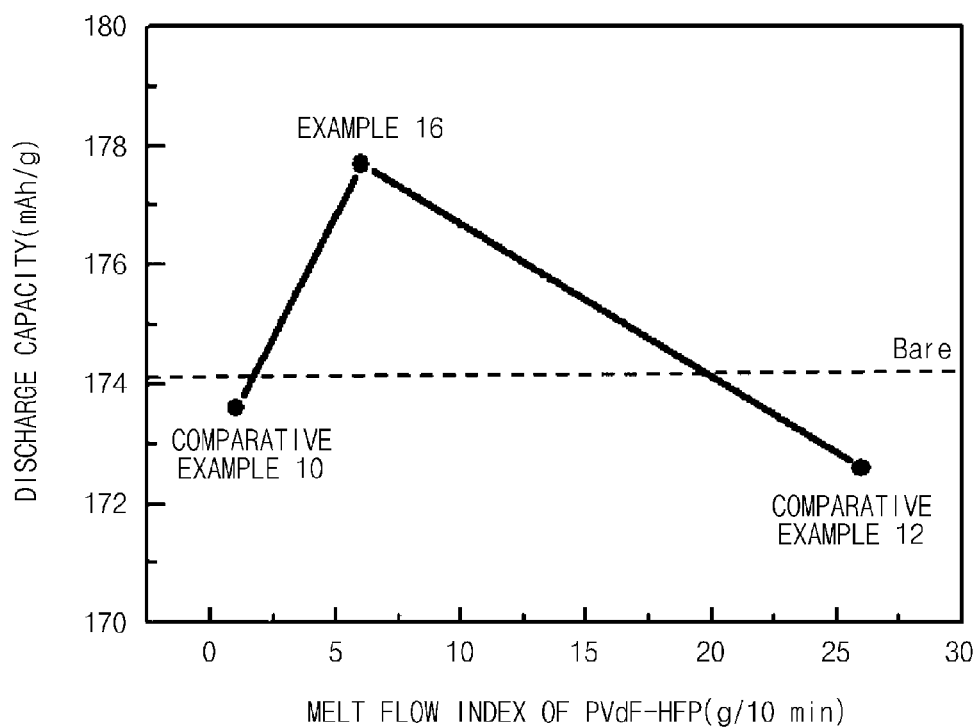
FIG. 4 is a graph illustrating capacity characteristics of lithium secondary batteries of Example 16 and Comparative Examples 10 and 12.

Also, FIG. 4 illustrates the results of measuring discharge capacities of the secondary batteries of Example 16 and Comparative Examples 10 and 12, in order to investigate changes in discharge capacity characteristics according to changes in melt flow index of the polyvinylidene fluoride-hexafluoropropylene copolymer.

Referring to FIG. 4, with respect to Example 16 in which the melt flow index of the polyvinylidene fluoride-hexafluoropropylene copolymer was 6 g/10 min, the discharge capacity was about 178 mAh/g. In contrast, with respect to Comparative Examples 10 and 12 in which the melt flow indices were outside the range of the present invention, i.e., 2 g/10 min or 26 g/10 min, it may be understood that the discharge capacities of the secondary batteries were in a range of 172 mAh/g to 174 mAh/g which were significantly lower than those of the present invention.

A method of manufacturing a lithium nickel complex oxide according to an embodiment of the present invention may adjust a ratio of divalent nickel ($Ni^{II}$) to trivalent nickel ($Ni^{III}$) by using a polyvinylidene fluoride-hexafluoropropylene (PVdF-HFP) copolymer and in particular, may increase the ratio of divalent nickel. As a result, the method may improve capacity characteristics of a secondary battery.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a lithium nickel complex oxide comprising:
preparing a mixture of a lithium nickel oxide and a polyvinylidene fluoride-hexafluoropropylene (PVdF-HFP) copolymer; and
heat treating the mixture in a temperature range of 250° C. to 500° C.,
wherein a melt flow index of the polyvinylidene fluoride-hexafluoropropylene copolymer is in a range of 3 g/10 min to 20 g/10 min when measured under a load of 2.16 kg in accordance with the ISO 1133 standard.

2. The method of claim 1, wherein an amount of hexafluoropropylene (HFP) in the polyvinylidene fluoride-hexafluoropropylene copolymer is in a range of 1 wt % to 30 wt %.

3. The method of claim 2, wherein the amount of HFP in the polyvinylidene fluoride-hexafluoropropylene copolymer is in a range of 5 wt % to 20 wt %.

4. The method of claim 1, wherein the polyvinylidene fluoride-hexafluoropropylene copolymer is used in an amount of 0.2 wt % to 0.5 wt % based on 100 wt % of the lithium nickel oxide.

5. The method of claim 1, wherein the lithium nickel oxide is doped with some fluorine (F) atoms of the polyvinylidene fluoride-hexafluoropropylene copolymer by the heat treatment.

6. The method of claim 5, wherein a doping amount of the F atoms is in a range of 1,000 ppm to 5,000 ppm.

7. The method of claim 1, wherein the lithium nickel oxide is $Li_wNi_xMn_yCo_zO_2$ (where x+y+z=1, 0.4≤x≤0.9, 0≤y≤0.6, 0≤z≤0.6, and 0.9≤w≤1.3).

* * * * *